US009165376B2

(12) United States Patent
Schwartzband et al.

(10) Patent No.: US 9,165,376 B2
(45) Date of Patent: Oct. 20, 2015

(54) SYSTEM, METHOD AND COMPUTER READABLE MEDIUM FOR DETECTING EDGES OF A PATTERN

(71) Applicant: APPLIED MATERIALS ISRAEL, LTD., Rehovot (IL)

(72) Inventors: Ishai Schwartzband, Or Yehuda (IL); Roman Kris, Jerusalem (IL); Shimon Levi, Tivon (IL)

(73) Assignee: Applied Materials Israel Ltd., Rehovot (IL)

( * ) Notice: Subject to any disclaimer, the term of this patent is extended or adjusted under 35 U.S.C. 154(b) by 306 days.

(21) Appl. No.: 13/837,896

(22) Filed: Mar. 15, 2013

(65) Prior Publication Data

US 2014/0270470 A1 Sep. 18, 2014

(51) Int. Cl.
*G06K 9/00* (2006.01)
*G06T 7/40* (2006.01)
*G06T 5/00* (2006.01)

(52) U.S. Cl.
CPC ............. *G06T 7/402* (2013.01); *G06K 9/0014* (2013.01); *G06T 5/003* (2013.01); *G06T 2207/20192* (2013.01); *G06T 2207/30148* (2013.01)

(58) Field of Classification Search
None
See application file for complete search history.

(56) References Cited

U.S. PATENT DOCUMENTS

| 5,650,337 | A * | 7/1997 | Cahen et al. | 438/22 |
| 2007/0229710 | A1 * | 10/2007 | Park et al. | 348/618 |
| 2008/0144917 | A1 * | 6/2008 | Liu et al. | 382/141 |
| 2008/0152220 | A1 * | 6/2008 | Shi et al. | 382/164 |
| 2009/0180713 | A1 * | 7/2009 | Bucha et al. | 382/300 |
| 2009/0238440 | A1 * | 9/2009 | Faivishevsky | 382/144 |
| 2010/0074406 | A1 * | 3/2010 | Hayashi et al. | 378/45 |

* cited by examiner

*Primary Examiner* — Bhavesh Mehta
*Assistant Examiner* — Andrew Moyer
(74) *Attorney, Agent, or Firm* — Kilpatrick Townsend & Stockton LLP

(57) ABSTRACT

A system, a non-transitory computer readable medium and a method for detecting a parameter of a pattern, the method comprises: obtaining an image of the pattern; wherein the image is generated by scanning the pattern with a charged particle beam; processing the image to provide an edge enhanced image; wherein the processing comprises computing an aggregate energy of first n spectral components of the image, wherein n exceeds two; and further processing the edge enhanced image and determining a parameter of the pattern.

20 Claims, 13 Drawing Sheets

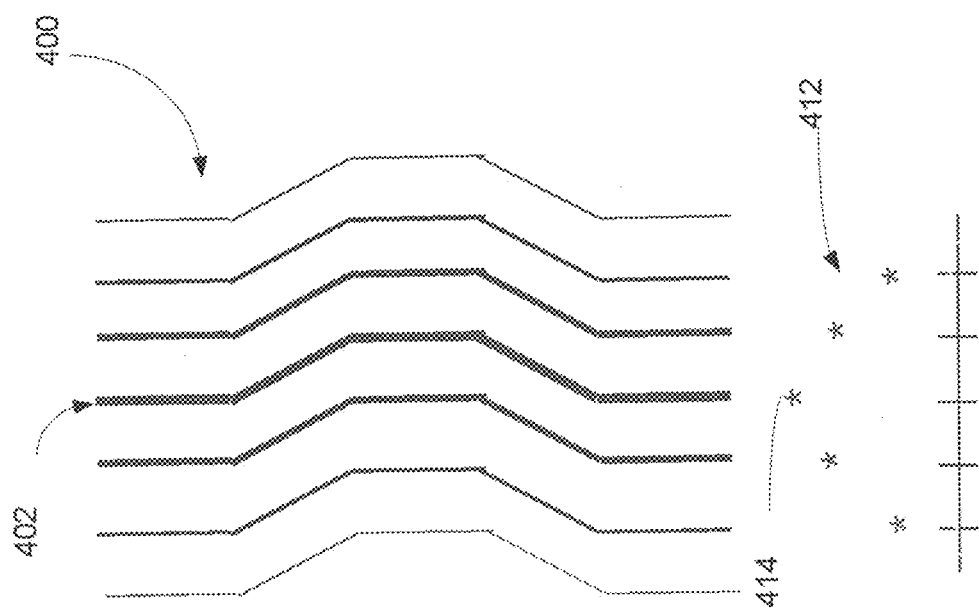

SYSTEM, METHOD AND COMPUTER READABLE MEDIUM FOR DETECTING EDGES OF A PATTERN

BACKGROUND OF THE INVENTION

In photolithography, critical dimension (CD) is the minimum features size that is to be patterned on the wafer or the minimal distance between adjacent features. The features can be lines, rectangles, elliptical or other shapes with any orientation, e.g. vertical, horizontal or other.

Critical dimension scanning electron microscopes (CD-SEM) are used to measure critical dimensions of such features by scanning an area of the wafer that includes such features with an electron beam to provide a SEM image. The SEM image is then processed by applying an edge detection process in order to detect edges of the features and to detect the distance between these edges.

Many prior art edge detection processes are based upon the assumption that the electron beam is much narrower than the width of the scanned lines therefore the interaction volume size created is such that each line should be represented by two clear edges.

Modern manufacturing process managed to shrink the dimensions of features and the electron beam is no longer much narrower than the width of the scanned lines.

There is a growing need to provide an accurate system, method and computer readable medium for edge detection.

BRIEF SUMMARY OF THE INVENTION

According to an embodiment of the invention, there is provided a method for detecting a parameter of a pattern, the method may include: obtaining an image of the pattern; wherein the image is generated by scanning the pattern with a charged particle beam; processing the image to provide an edge enhanced image; wherein the processing comprises computing an aggregate energy of first n spectral components of the image, wherein n exceeds two; and further processing the edge enhanced image and determining a parameter of the pattern.

The method may include computing the aggregate energy by applying spectral functions on the image, wherein the spectral functions are selected according to a distribution of charged particles in the charged particle beam. The spectral functions may be discrete orthonormal functions.

The computing may include applying an n'th order polynomial filter on the image.

The method may include finding a main direction of the edges of the pattern; and wherein the applying of the n'th order polynomial filter is responsive to the main direction.

The method may include applying the n'th order polynomial filter at a direction that is substantially normal to the main direction.

The method may include applying an averaging function at a direction that is substantially parallel to the main direction.

The n'th polynomial filter may include a combination of n orthogonal or orthonormal polynomials of first till n'th order.

The method may include detecting paths of the edge enhanced image by applying a dynamic programming process that is responsive to a main direction of edges of the pattern.

The method may include detecting paths of the edge enhanced image by repetitively: finding a best path by applying a dynamic programming process, and mitigating an effect of the best path before finding a next best path.

The method may include clustering paths according to a score associated with each path and ignoring paths that belong to a lowest score cluster.

The clustering of paths may include clustering the paths so that a largest difference between any scores of paths that belong to a same cluster is smaller than any difference between scores of paths that belong to different clusters.

The method may include obtaining an image of a pattern that comprises multiple lines by scanning the pattern with a charged particle beam, wherein a width of at least one of the multiple lines is smaller than a width of the charged particle beam.

There may be provided a non-transitory computer readable medium that stores instructions for obtaining an image of the pattern; wherein the image is generated by scanning the pattern with a charged particle beam; processing the image to provide an edge enhanced image; wherein the processing comprises computing aggregate energy of first n spectral components of the image, wherein n exceeds two; and further processing the edge enhanced image and determining the parameter of the pattern. The method may include finding edges of the pattern by detecting paths in the edge enhanced image.

A non-transitory computer readable medium that stores instructions for: obtaining an image of the pattern; wherein the image is generated by scanning the pattern with a charged particle beam; processing the image to provide an edge enhanced image; wherein the processing comprises computing aggregate energy of first n spectral components of the image, wherein n exceeds two; and further processing the edge enhanced image and determining a parameter of the pattern.

The computing may include applying an n'th order polynomial filter on the image.

The non-transitory computer readable medium may store instructions for finding a main direction of the edges of the pattern; and wherein the applying of the n'th order polynomial filter is responsive to the main direction.

The non-transitory computer readable medium may store instructions for applying the n'th order polynomial filter at a direction that is substantially normal to the main direction.

The non-transitory computer readable medium may store instructions for applying an averaging function at a direction that is substantially parallel to the main direction.

The n'th polynomial filter may include a combination of n orthogonal or orthonormal polynomials of first till n'th order.

The non-transitory computer readable medium may store instructions for detecting paths of the edge enhanced image by applying a dynamic programming process that is responsive to a main direction of edges of the pattern.

The non-transitory computer readable medium may store instructions for detecting paths of the edge enhanced image by repetitively: finding a best path by applying a dynamic programming process, and mitigating an effect of the best path before finding a next best path.

The non-transitory computer readable medium may store instructions for clustering paths according to a score associated with each path and ignoring paths that belong to a lowest score cluster.

The clustering of paths may include clustering the paths so that a largest difference between any scores of paths that belong to a same cluster is smaller than any difference between scores of paths that belong to different clusters.

The non-transitory computer readable medium may store instructions for obtaining an image of a pattern that comprises multiple lines by scanning the pattern with a charged particle beam, wherein a width of at least one of the multiple lines is smaller than a width of the charged particle beam.

There may be provided a system that may include a memory module arranged to store an image of a pattern; wherein the image is generated by scanning the pattern with a charged particle beam; an edge enhancement circuit arranged to process the image to provide an edge enhanced image by computing aggregate energy of first n spectral components of the image, wherein n exceeds two; and a detection circuit arranged to further processing the edge enhanced image and determining the parameter of the pattern. The detection circuit may be arranged to find edges of the pattern by detecting paths in the edge enhanced image.

The system may be arranged to compute the aggregate energy by apply spectral functions on the image, wherein the spectral functions are selected according to a distribution of charged particles in the charged particle beam. The spectral functions may be discrete orthonormal functions.

The compute may include apply an n'th order polynomial filter on the image.

The system may be arranged to find a main direction of the edges of the pattern; and wherein the applying of the n'th order polynomial filter is responsive to the main direction.

The system may be arranged to apply the n'th order polynomial filter at a direction that is substantially normal to the main direction.

The system may be arranged to apply an averaging function at a direction that is substantially parallel to the main direction.

The n'th polynomial filter may include a combination of n orthogonal or orthonormal polynomials of first till n'th order.

The system may be arranged to detect paths of the edge enhanced image by apply a dynamic programming process that is responsive to a main direction of edges of the pattern.

The system may be arranged to detect paths of the edge enhanced image by repetitively: find a best path by apply a dynamic programming process, and mitigating an effect of the best path before find a next best path.

The system may be arranged to cluster paths according to a score associated with each path and ignoring paths that belong to a lowest score cluster.

The cluster of paths may include cluster the paths so that a largest difference between any scores of paths that belong to a same cluster is smaller than any difference between scores of paths that belong to different clusters.

The system may be arranged to obtain an image of a pattern that comprises multiple lines by scanning the pattern with a charged particle beam, wherein a width of at least one of the multiple lines is smaller than a width of the charged particle beam.

There may be provided a method for detecting edges of a pattern, the method may include obtaining an image of the pattern; wherein edges of the pattern have a main direction; performing an edge enhancement operation on the image to provide an edge enhanced image; and detecting paths of the edge enhanced image by repetitively: (a) finding a best path by applying a dynamic programming process, and (b) mitigating an effect of the best path before finding a next best path.

There may be provided a non-transitory computer readable medium that stores instructions for obtaining an image of a pattern; wherein edges of the pattern have a main direction; performing an edge enhancement operation on the image to provide an edge enhanced image; and detecting paths of the edge enhanced image by repetitively: (a) finding a best path by applying a dynamic programming process, and (b) mitigating an effect of the best path before finding a next best path.

There may be provided a system that is arranged to obtain an image of the pattern; wherein edges of the pattern have a main direction; perform, by an edge enhancement circuit, an edge enhancement operation on the image to provide an edge enhanced image; and detecting paths of the edge enhanced image, by a edge detection circuit, by repetitively: (a) finding a best path by applying a dynamic programming process, and (b) mitigating an effect of the best path before finding a next best path.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 8A, 8B and 9 illustrate a mitigation process applied on a strongest path according to an embodiment of the invention;

Figure 1:
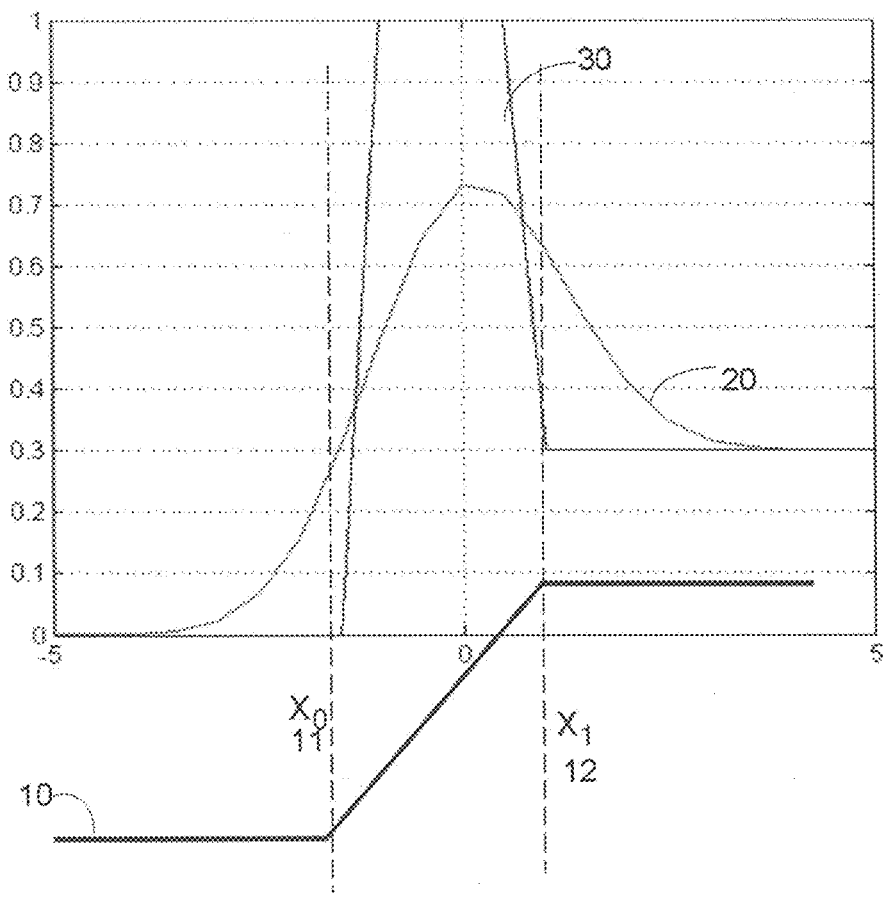
FIG. 1 illustrates a profile of an edge, a point wise yield function and a detection signal.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Edge Enhancement Using n'th Order Polynomial Filter.

An image of a pattern is obtained. The pattern may include multiple features such as but not limited to lines that may be substantially parallel to each other. The image may be obtained by scanning an object that bears the pattern with a scanning charged particle beam—such as a scanning electron beam. For ease of explanation and by way of example, the invention will be described herein with reference to the detection of Semiconductor wafers bearing patterns having edges (such as lines, rectangles with strait or elliptical edges), by an electron beam microscope. It should be noted that the invention is not limited to the described example and can be implemented for various types of patterns, in various shapes and sizes, carried by various types of objects, and detected by various charge particles technologies.

As a result of the interaction of the charged particles with the scanned object in a certain interaction volume, secondary electrons are emanated from the interaction volume and collected. Some of the electrons that are scattered or reflected from the pattern may also be detected. The electrons are collected by one or more detectors that in turn provide detected signals that may form an image.

The one or more detectors can be secondary electron detectors, backscattered electron detectors and the like. The detected signals are responsive to the shapes of the scanned features, to the expected yield of the scanned features and to the shape and size of the electron beam. Typically, the detected signal includes a noise component which is contributed e.g. by the electronics, electron beam source, column optics, detector and other known reasons and effects. Thus, the detected signals include pattern components and noise components.

Many prior art metrology techniques (e.g. edge detection processes and more) effectively differentiate between the edges of the lines (known as 'coarse edge detection') and are suitable for patterns having critical dimensions (e.g. line width) which are much wider that the electron beam. Under this condition each line should be represented in the detected signal by two clear edges. Modern manufacturing process managed to shrink the dimensions of features and the electron beam is no longer much narrower than the width of the scanned lines. It was found that when the interaction volume of the primary particle beam with the scanned object is in the same scale of the measured pattern (e.g. when the electron beam is no longer much narrower than the width of the scanned lines), prior art edge detection processes cannot effectively differentiate between the two edges of the lines. As a result, in the detected signal, one edge is received per line, representing a superposition of the two edges (edge crosstalk). Edge cross-talk is degrading the ability to accurately measure parameters such as feature physical dimension (e.g. line width), feature roughness, edge slope, feature height, and feature material. The present invention overcomes this by performing an image processing operation on the detected signal before it is processed for the determination of the desired parameter. The present invention can be used with and be integrated with known methods for determining feature parameters such as feature physical dimension (e.g. line width), feature roughness, edge slope, feature height, feature material.

As illustrated below the suggested method, system and computer readable medium take into account the pattern and electron beam parameters—especially the shape and size of the electron beam in relation to the shape and size of edges of the pattern.

FIG. 1 illustrates a profile of an edge 10, a point wise yield function 30 and a detected signal 20 resulting from scanning the edge. The edge has a lineal shape and is delimited by points X1 11 and X2 12.

The point wise yield function 30 approximates the amount of electrons to be emitted by the edge 10 if being scanned with a zero size electron beam. In mathematical terms the detected signal can be regarded as a convolution between the point wise yield function 30 and the shape of the edge 10. It was shown that a third order (or a higher order) polynomial can approximate the detected signal 20 and that an n'th order polynomial representation (wherein n>2) of the detected signal can assist in separating the pattern signal component ("clean signal") from the noise component.

Figure 2:
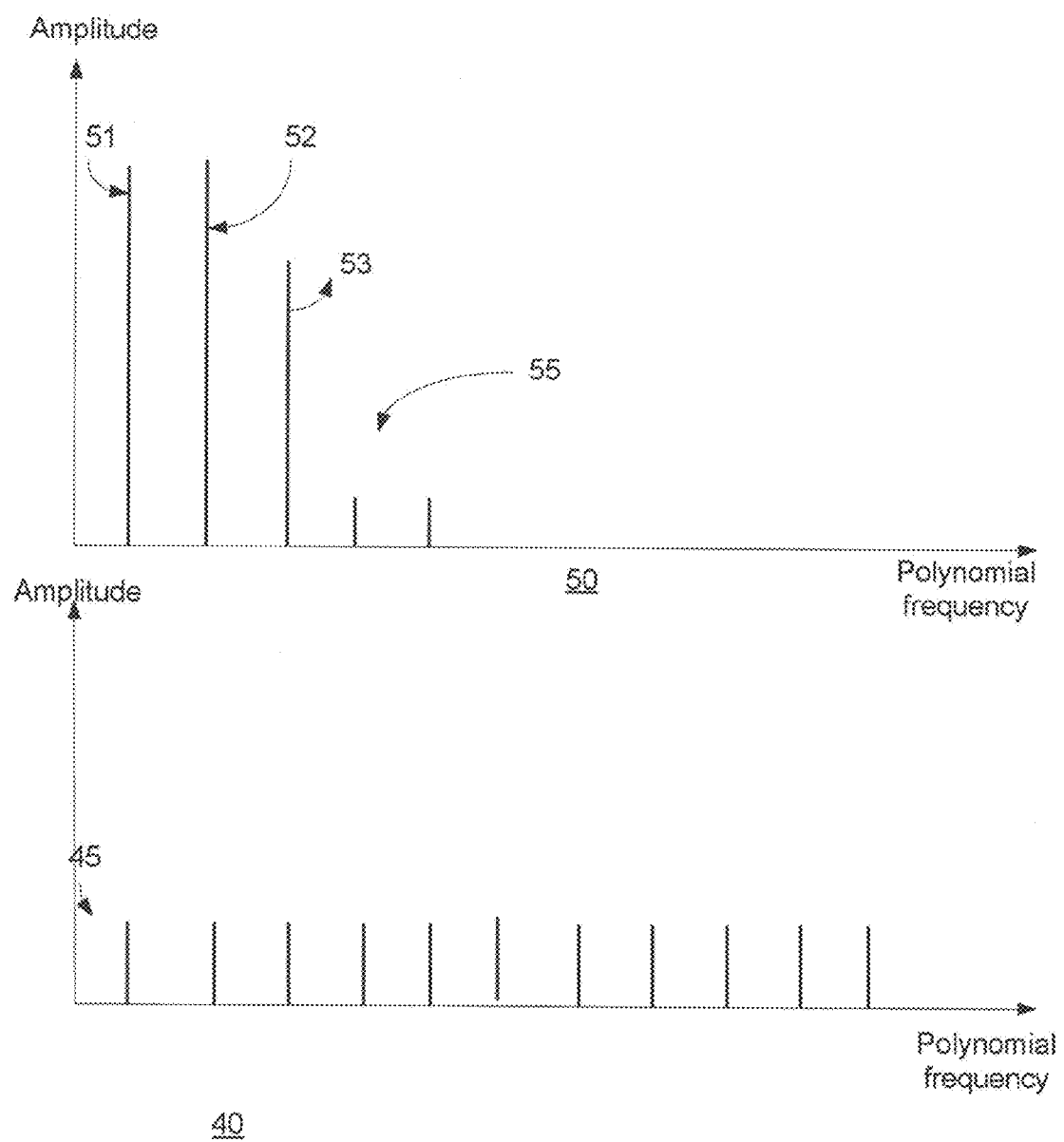
FIG. 2 illustrates polynomial spectral components of a detected signal, having a pattern component and a noise component, according to an embodiment of the invention.

While the different noise polynomial spectral components are relatively even, most of the polynomial energy of the clean signal is concentrated at the first till n'th (for example—first till third) polynomial spectral components. This is illustrated by polynomial spectral components 51-53 and residual components 55 of a clean detection signal (upper part of FIG. 2) and by polynomial spectral components 45 of the noise (lower part of FIG. 2). The signal to noise ratio of the first polynomial spectral components of the detected signal is higher than the signal to noise ratio of higher order polynomial spectral components of the noisy detection signal. The detected signal includes edge information. An edge enhancement process can include applying an n'th order polynomial filter on an image that includes multiple detected signals.

Figure 3:
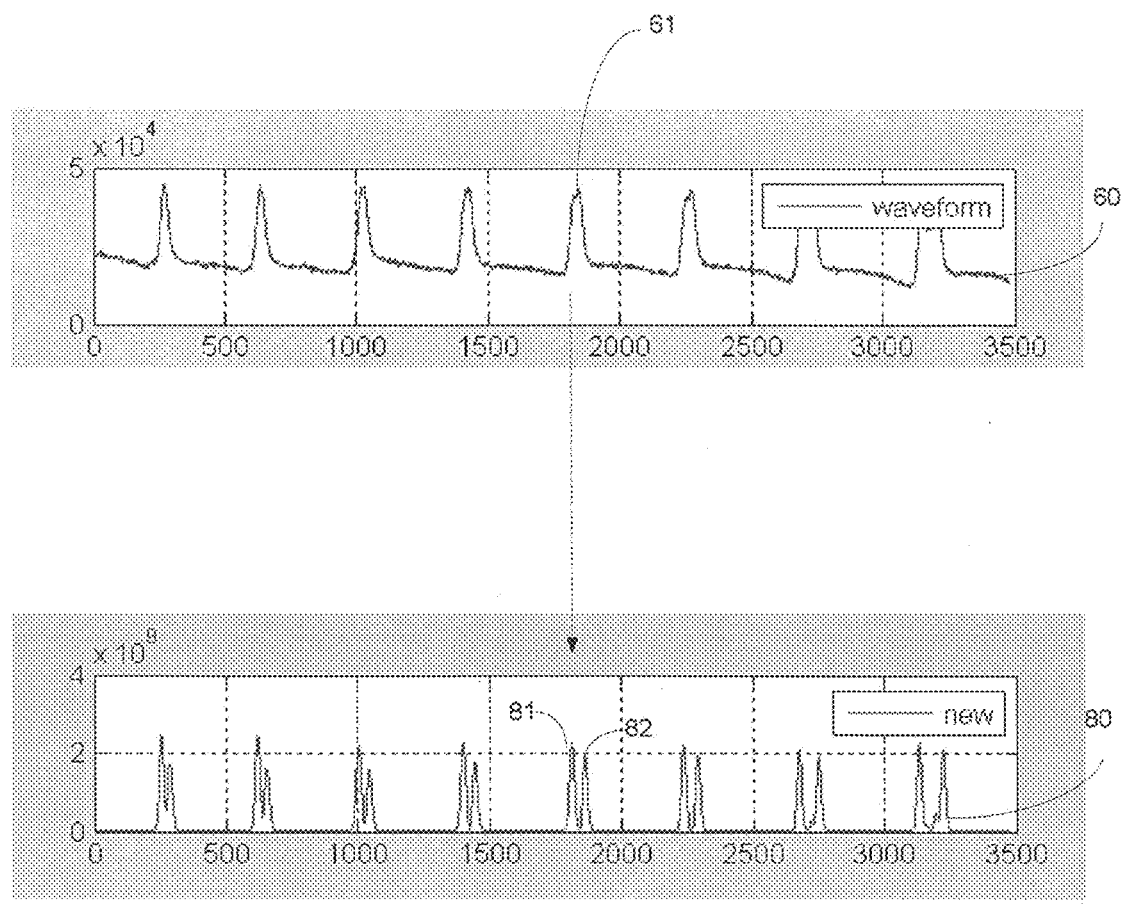
FIG. 3 illustrates a detected signal and an edge enhanced signal, according to an embodiment of the invention.

FIG. 3 illustrates detected signals 60 and edge enhanced signals 80, according to an embodiment of the invention. The detected signals 60 are a sequence of pixels from the image and are taken along a direction that is normal to the main direction of the pattern.

Each peak of the detected signals (each line) is represented by two adjacent peaks of the edge enhances signals 80. For example, a line that is represented by peak 61 is represented by two peaks 81 and 82 of the edge enhanced signals 80. FIG. 3 illustrates that each line—regardless of its width—is represented by a pair of two peaks.

Figure 4:
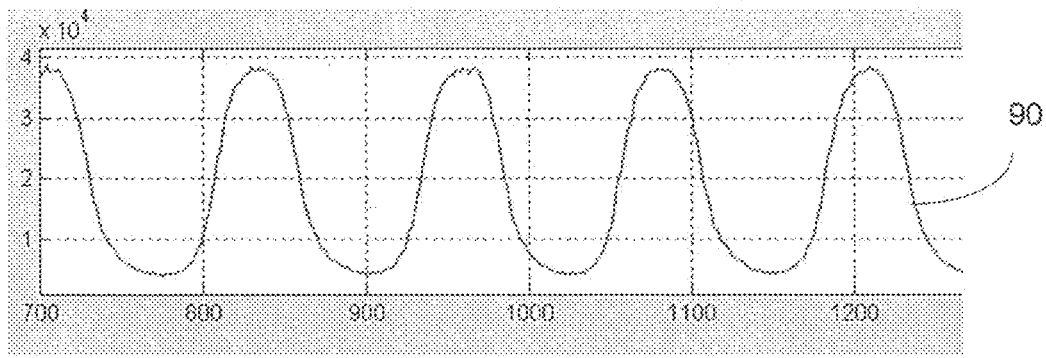
FIG. 4 illustrates a detected signal and an edge enhanced signal, according to an embodiment of the invention.
Figure 4:
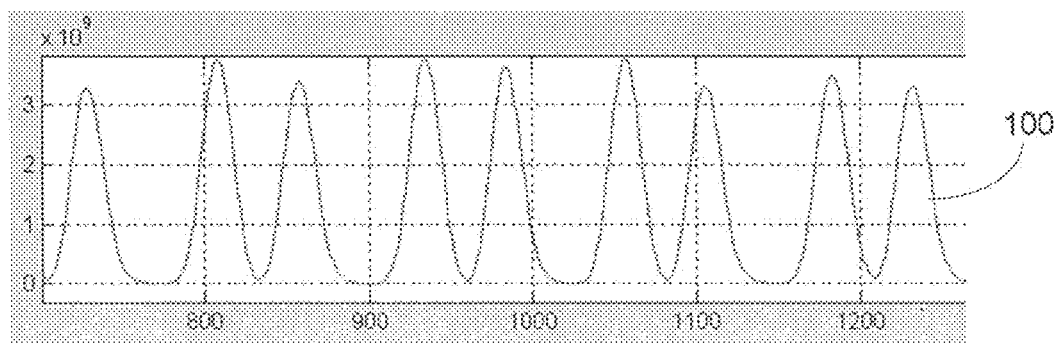

FIG. 4 illustrates detected signals 90 and edge enhanced signals 100, according to an embodiment of the invention. The detected signals 90 are a sequence of pixels from the image and are taken along a direction that is normal to the main direction of edges of the image. FIG. 4 also illustrates that each line—regardless of its width—is represented by a pair of two peaks.

The polynomial spectral components can be calculated by applying a third order polynomial filter. Applying a third order polynomial filter is equivalent to a multiplication of the pixels of the image by a set of polynomials of the first till third order. These polynomials can be orthogonal to each other but this is not necessarily so. An example of such a set of polynomials is a set of discrete Chebyshev orthonormal polynomials.

The third order polynomial filter can be one-dimensional or two-dimensional. A one-dimensional third order polynomial filter operates on a sequence of pixels of the image. It can be applied at a direction that can be normal to the main direction of edges of the image or otherwise oriented in relation to the main direction.

Figure 5:
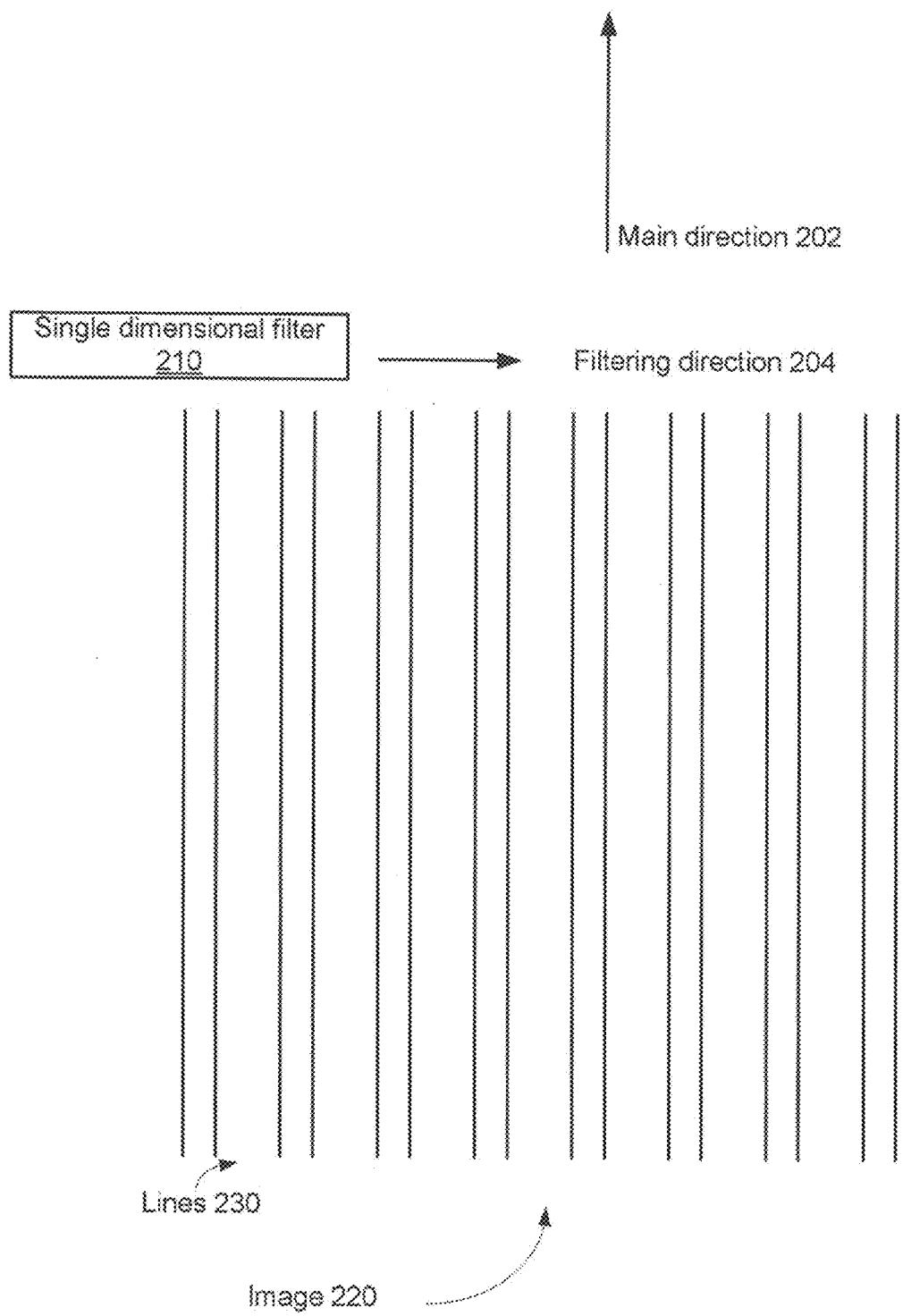
FIG. 5 illustrates a single dimension third order polynomial filter applied on an image of vertical lines, according to an embodiment of the invention.

FIG. 5 illustrates a one-dimensional third order filter 210 (one dimensional kernel) that is applied along a filtering direction 204 that is normal to the main direction 202 of edges of lines 230 of an image 220.

The following equations provide an example of a set of orthonormal polynomials of the zero till third order P0 ... P3. N represents a length of a third order polynomial filter, index i represents a location of a pixel along a filtering direction. Variables t0-t3 are used for brevity of explanation only.

$$t_0 = 1$$

$$t_1 = 2i - N + 1$$

$$t_{i2} = \tfrac{1}{2}(3 \cdot (2i-N+1) \cdot t_1 - (N^2-1) \cdot t_0)$$

$$t_{i3} = \tfrac{1}{3}(5 \cdot (2i-N+1) \cdot t_2 - 2(N^2-4) \cdot t_1)$$

$$P_0 = t_0 / \sqrt{N}$$

$$P_1 = t_1 / \sqrt{(N-1)N(N+1)/3}$$

$$P_2 = t_2 / \sqrt{(N-2)(N-1)N(N+1)(N+2)/5}$$

$$P_3 = t_3 / \sqrt{(N-3)(N-2)(N-1)N(N+1)(N+2)(N+3)/7}$$

Figure 6:
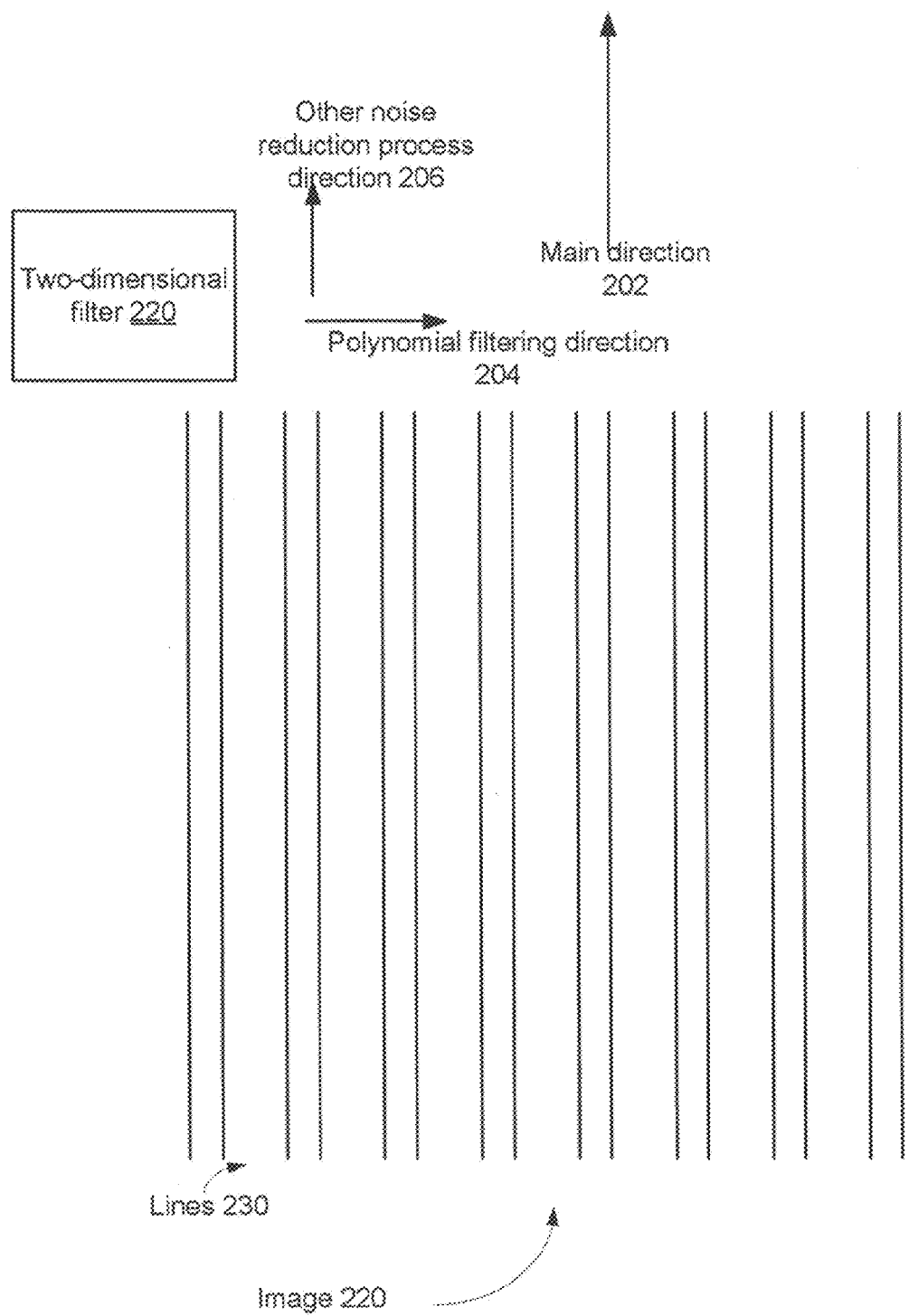
FIG. 6 illustrates a two dimensional filter applied on an image of vertical lines, according to an embodiment of the invention.

FIG. 6 illustrates a two-dimensional third order filter 220 that applies a third order polynomial filtering a along a polynomial filtering direction 204 that is oriented to (for example—normal) to the main direction 202 of edges of lines 230 of an image 220. The two-dimensional third order filter 220 may also apply another noise reduction process (such as averaging or any other noise reduction process) along the main direction 202 (or along a direction that differs from the polynomial filtering direction).

Dynamic Processing with Blocking

The mentioned above edge enhancement process provides an edge enhanced image that include many pixels. This processing stage finds the edges of the edge enhanced image by applying dynamic processing with blocking.

Dynamic programming is a method for solving complex problems by breaking them down into simpler sub-problems. It is applicable to problems exhibiting the properties of overlapping sub-problems which are only slightly smaller and optimal substructure. When applicable, the method takes far less time than naive methods. The key idea behind dynamic programming is quite simple. In general, to solve a given problem, we need to solve different parts of the problem (sub-problems), and then combine the solutions of the sub-problems to reach an overall solution. Often, many of these sub-problems are really the same. The dynamic programming approach seeks to solve each sub-problem only once, thus reducing the number of computations. This is especially useful when the number of repeating sub-problems is exponentially large. Top-down dynamic programming simply means storing the results of certain calculations, which are later used again since the completed calculation is a sub-problem of a larger calculation. Bottom-up dynamic programming involves formulating a complex calculation as a recursive series of simpler calculations.

In the content of the current embodiment of the invention dynamic programming involves finding best paths that represent edges. According to an embodiment of the invention each pixel of the edge enhanced image has a node metric (which is the value of the pixel or represents the value of the pixel) and the transitions from one pixel to another are assigned with a weight (path metric) that represent a deviation from the main direction of the edges of the pattern.

The weights that are assigned to the transition along the main direction can be higher or otherwise represent higher probability than the weights that are assigned to transitions that deviate from that main direction. The weights can be assigned under a linear or non-linear mapping between a weight and a deviation of a transition and the main direction.

Figure 7:
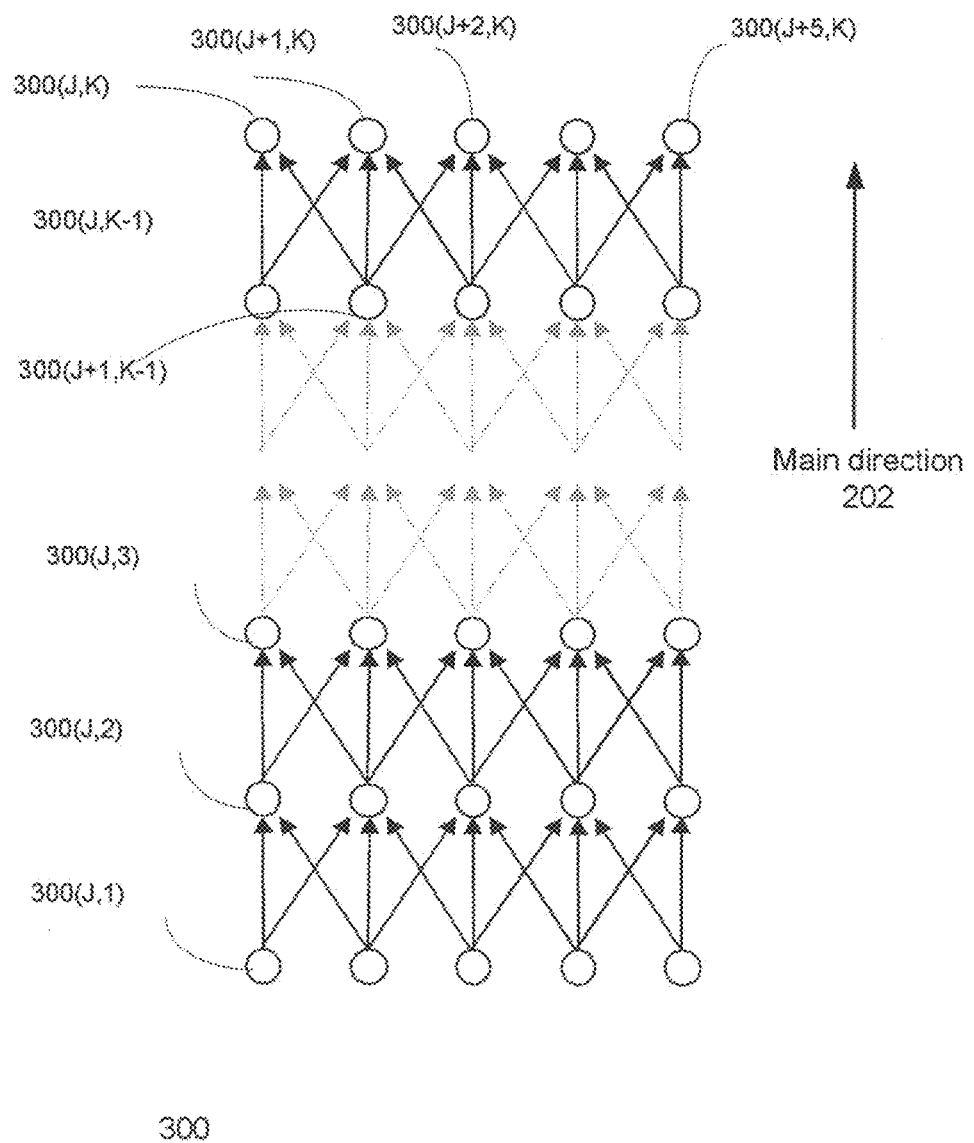
FIG. 7 illustrates a dynamic processing representation of a group of pixels of an edge enhanced image according to an embodiment of the invention.

Referring to FIG. 7, an array of pixels of an edge enhanced image form an array of nodes. The array of pixels of FIG. 7 includes K rows and six columns and may represent only a small portion of the entire edge enhanced image. The highest row of pixels includes pixels 300(J, K)-300(J+5, K). The second highest row of pixels starts by pixel 300(J, K−1). The three lowers rows of the array start by pixels 300(J, 1), 300(J, 2) and 300(J, 3) respectively.

Each pixel is linked to three pixels by three possible transitions—vertical transition, 45 degrees transition and 135 degrees transition. For example, pixel 300(J+1, K−1) is linked by (a) a vertical transition to pixel 300(J+1, K), (b) a 45 degrees transition to pixel 300(J+2, K) and (c) a 135 degrees transition to pixel 300(J, K).

The weight assigned to each of these transitions is responsive to the main direction. Assuming, for example, that the main direction is vertical then the vertical transition is assigned with the highest probability and the two other transitions are assigned lower probabilities.

Figure 8B:
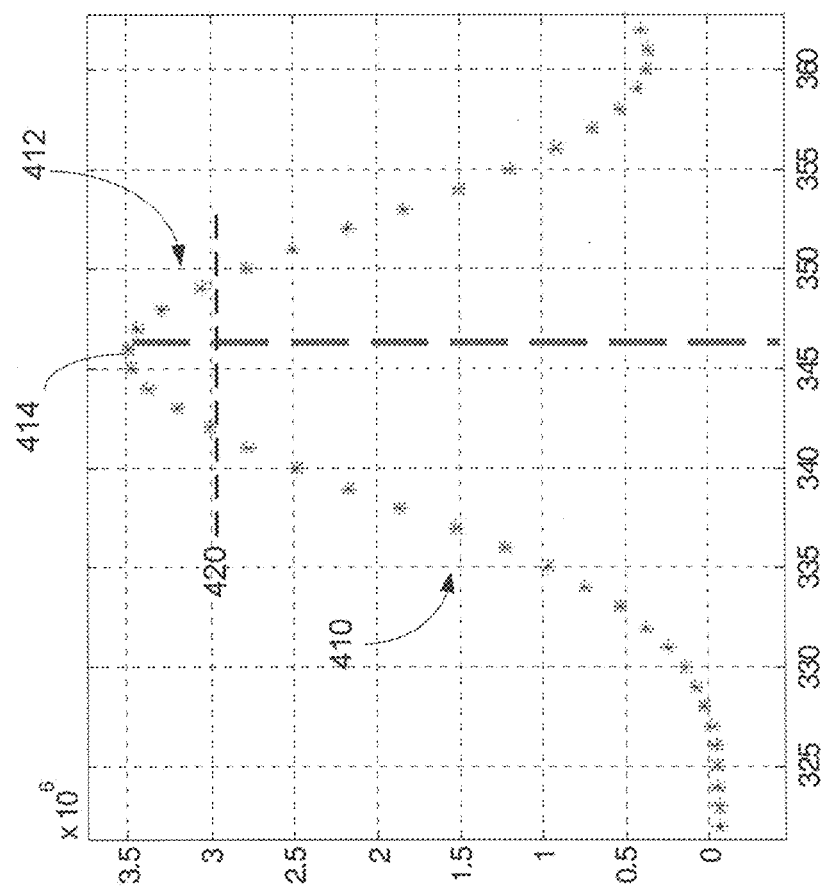

Each dynamic processing iteration includes calculating scores for multiple paths, taking into account the values of the pixels and the values of the transitions. At the end of each iteration a score can be provided for each path. FIG. 8B includes a group of scores 410 that are assigned to different paths.

According to an embodiment of the invention there are provided multiple iterations of dynamic programming. One or more of these dynamic programming iterations can be followed by blocking—mitigating the effect of a strongest path on its environment. Accordingly—after finding a strongest path (by an iteration of the dynamic programming process)—the affect of the strongest path on adjacent pixels is mitigated. After this mitigation the next strongest path is searched for—by performing another iteration of the dynamic programming process.

Figure 9:
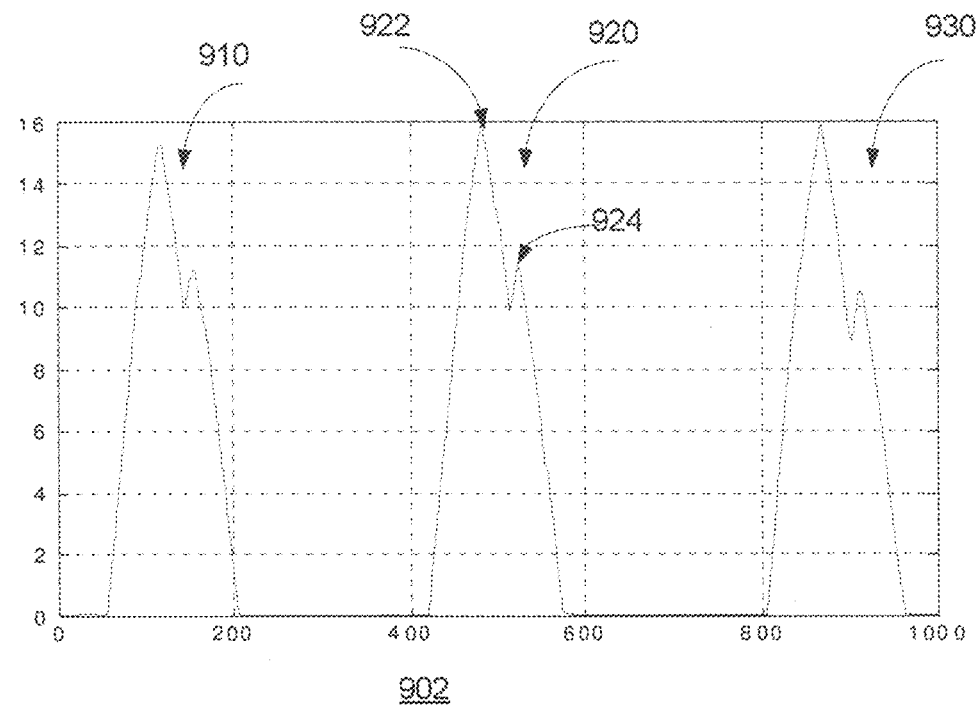
Figure 9:
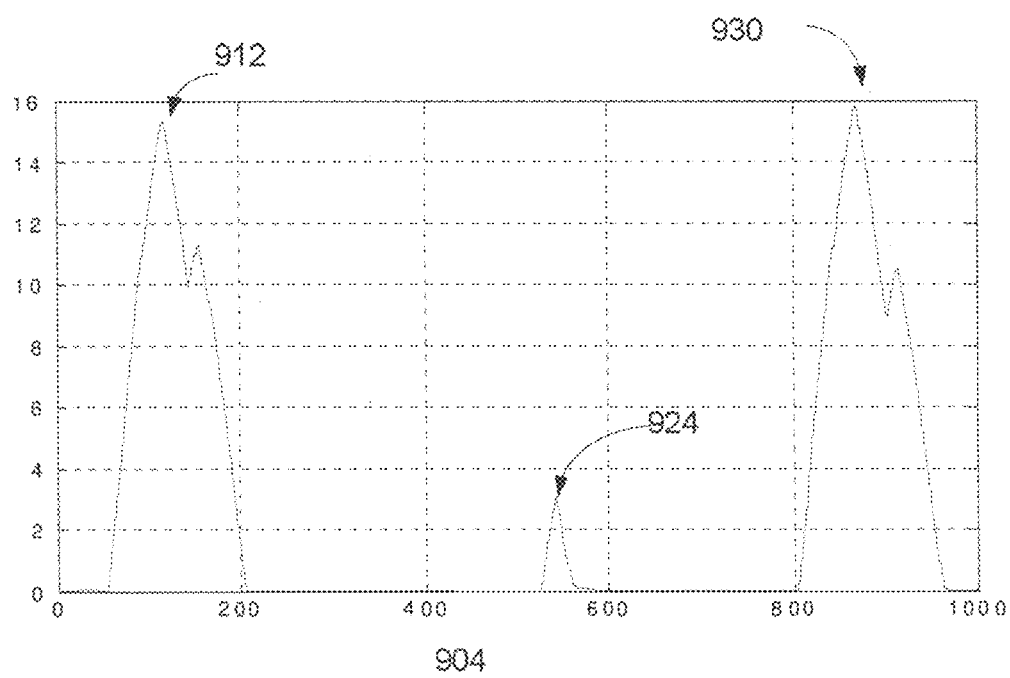

The upper part of FIG. 9 (graph 902) illustrates three peaks 910, 920 and 930. Each one of peaks 910, 920 and 930 includes a main peak and a secondary peak—such as main peak 922 and secondary peak 924 of peak 920. It is assumed that main peak 922 represents the strongest path and thus its effect is mitigated—as illustrated by graph 904 (lower part of FIG. 9)—leaving (from peak 920) only a secondary peak 924 of a lower value.

FIG. 8A illustrates multiple paths 400 that include a strongest path 402. Each path is illustrates by a combination of lines and the width of each line represents the score assigned to the path. The lower part of FIG. 8A illustrates the scores 412 assigned to paths 400. These scores include the score 414 assigned to the strongest path 402.

FIG. 8B illustrates scores 410 that are assigned to different paths (paths 400 of FIG. 8A and additional paths not shown in FIG. 8A). This figure also illustrates a threshold 420 that partitions the scores 410 to (a) scores that are below the threshold and (b) scores 412 (of paths 400) that are above the threshold.

The blocking process includes applying a function that will reduce the score assigned to paths that are affected by the strongest path. These so-called affected paths (for example—all paths 400 except the strongest path) can be determined by their proximity to the strongest path (for example—N pixels from each side of the path), or can be determined by searching for transition sequences that start from any node of the strongest path.

Referring to the example set forth in FIG. 7—the latter may include searching any pixel that can be linked by a sequence of vertical transitions, 45 degrees transition and 135 degrees transitions to pixels of the strongest path. The affected paths can include pixels and the score of these pixels can be lowered during the mitigation process.

The mitigating function can zero the scores of the pixels (nodes) or reset the scored to a predetermined value. The mitigation process can apply a linear or non-linear function that may be responsive to parameters such as a distance to the pixels of the strongest path.

Clustering

The outcome of the mentioned above stages is a group of paths and their scores. Some of these paths can be ignored. The selection between paths that are expected to represent edges and paths that can be ignored of can be assisted by clustering the scores and ignoring the paths that have scores that belong to the one or more lowest score clusters. This may include ignoring paths that their scores belong to the lowest score cluster.

Figure 10:
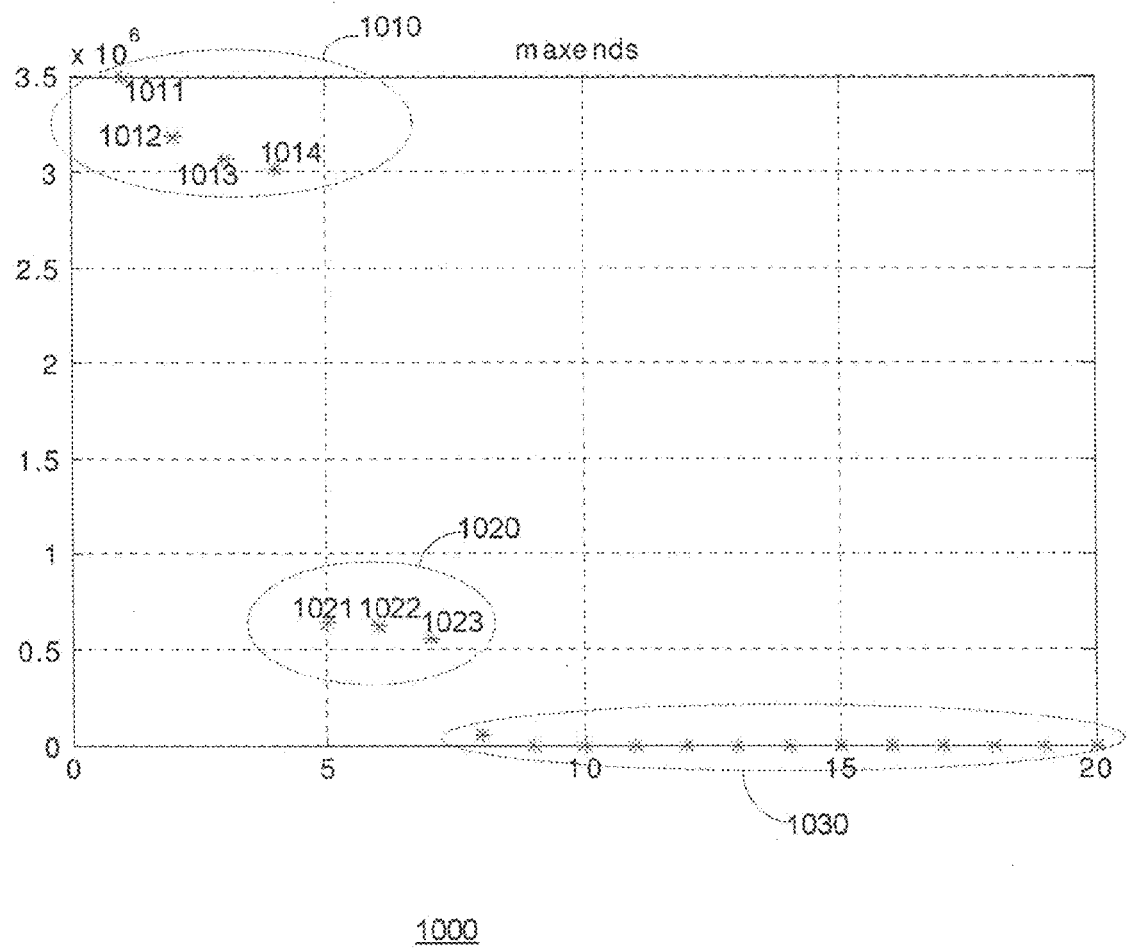
FIG. 10 illustrates a clustering process according to an embodiment of the invention.

FIG. 10 illustrates three clusters—first cluster 1010 (including scores 1011-1014), second cluster 1020 (includes scores 1021-1023) and noise cluster 1030 (includes many scores). The distance between each of these clusters (path score differences) is larger that the difference between scores of the same cluster.

According to an embodiment of the invention clustering of paths includes clustering the paths so that a largest difference between any scores of paths that belong to a same cluster is smaller than any difference between scores of paths that belong to different clusters. It is noted that other clustering rules can be applied.

Overall Process

Figure 11:
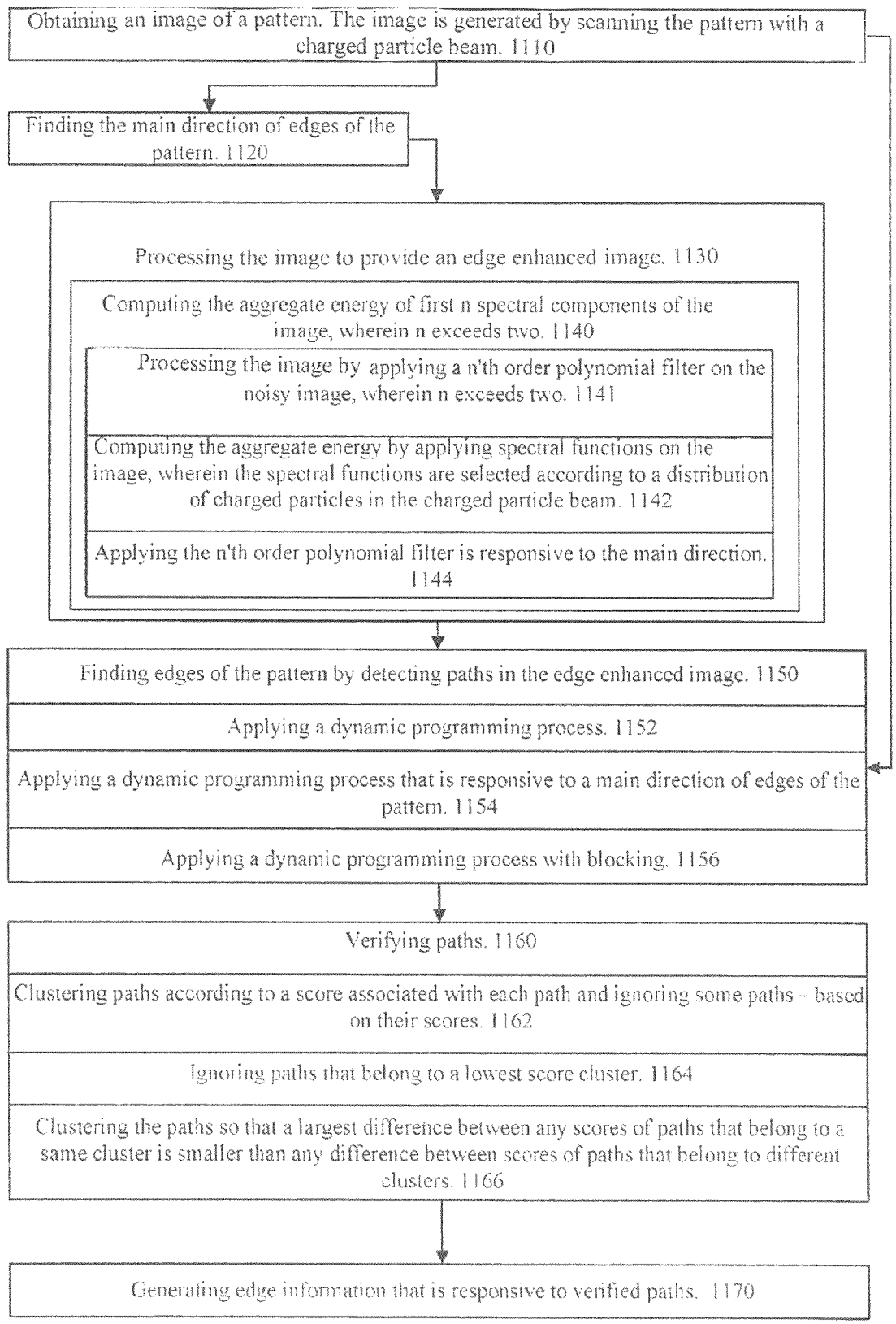
FIG. 11 illustrates a method according to an embodiment of the invention.

FIG. 11 illustrates a method 1100 according to an embodiment of the invention. Method 1100 starts by stage 1110 of obtaining (receiving or generating) an image of a pattern. The image is generated by scanning the pattern with a charged particle beam such as an electron beam.

The pattern can include multiple features such as lines that have a line width. The lines can be close to each other by a distance that is not much bigger than the width of the charged particle beam (when impinging on the pattern). The distance can be smaller than the width of the charged particle beam. The line width can be smaller than the width of the charged particle beam or slightly bigger than the latter.

The pattern can have a main direction. The main direction can represent the directions of the various edges of the pattern. It can be the average of the directions of various edges of the pattern or an otherwise dominant direction of the pattern. For example, if the pattern includes multiple lines that should form an array of vertical lines than the main direction is vertical.

Stage 1110 may be followed by stages 1120 and 1130. It is noted that stage 1130 can be included in stage 1120, may follow stage 1130 or may precede it. Stage 1120 may include finding the main direction of the edges of the pattern. Stage 1120 may include finding edges of the image and then finding the main direction of these edges—for example by averaging directional information about the edges.

Stage 1130 may include processing the image to provide an edge enhanced image. Stage 1130 may include stage 1140 of computing the aggregate energy of first n spectral components of the image, wherein n exceeds two. Stage 1140 may include stage 1141 of processing the image by applying a n'th order polynomial filter on the image, wherein n exceeds two. Stage 1140 may include stage 1142 of computing the aggregate energy by applying spectral functions on the image, wherein the spectral functions are selected according to a distribution of charged particles in the charged particle beam.

They may be selected to allow a reconstruction of the edge—as illustrated in FIG. 1. The spectral functions may be discrete orthonormal functions.

Stage 1140 may include stage 1144 of applying the n'th order polynomial filter is responsive to the main direction. Stage 1144 can include applying the n'th order polynomial filter at a direction that is substantially normal to the main direction. Stage 1144 can also include applying an averaging function at a direction that is substantially parallel to the main direction.

The n'th polynomial filter can include a combination of n orthogonal polynomials of first till n'th order. The orthogonal polynomials can be normalized to provide orthonormal polynomials of first till n'th order.

Stages 1130 and 1120 may be followed by stage 1150 of finding edges of the pattern by detecting paths in the edge enhanced image. Stage 1150 can include stage 1152 of applying a dynamic programming process. Stage 1150 can include stage 1154 of applying a dynamic programming process that is responsive to a main direction of edges of the pattern. Stage 1150 can include stage 1156 of applying a dynamic programming process with blocking Stage 1156 can include detecting paths of the edge enhanced image by repetitively: finding a best path by applying a dynamic programming process, and mitigating an effect of the best path before finding a next best path.

Stage 1150 can be followed by stage 1160 of verifying paths. Stage 1160 may include stage 1162 of clustering paths according to a score associated with each path and ignoring some paths—based on their scores. Stage 1160 may include stage 1164 of ignoring paths that belong to a lowest score cluster. Stage 1160 may include stage 1166 of clustering the paths so that a largest difference between any scores of paths that belong to a same cluster is smaller than any difference between scores of paths that belong to different clusters.

Stage 1160 can be followed by stage 1170 of generating edge information that is responsive to verified paths. This may include generating an image but this is not necessarily so. Stage 1170 can include generating an output image that includes edges that were verified during stage 1160 and does not include edges that should have been ignored from—according to stage 1160. The edge information can be processed to provide metrology information such as critical dimensions of the features of the pattern.

Figure 12:
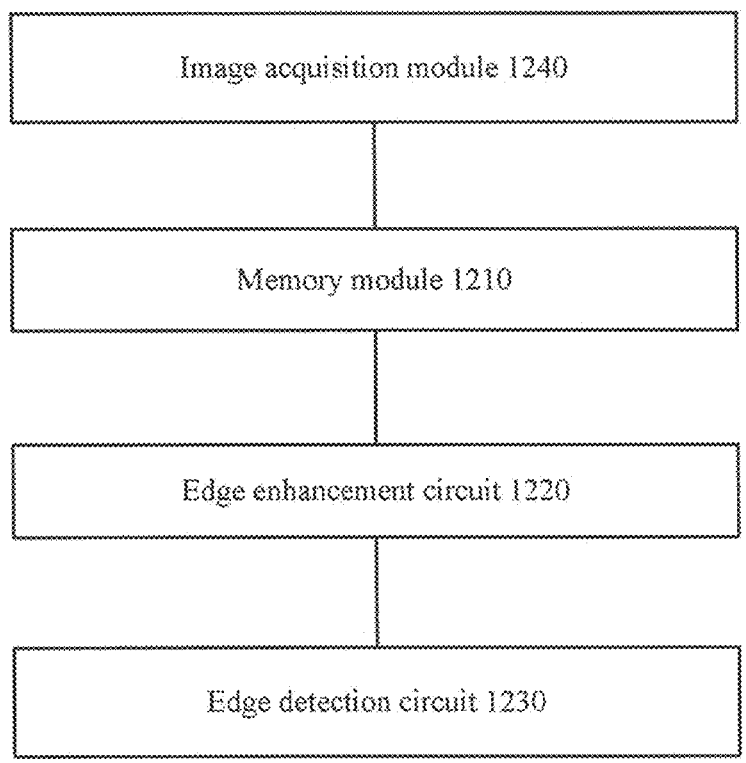
FIG. 12 illustrates a system according to an embodiment of the invention.

FIG. 12 illustrates a system 1200 according to an embodiment of the invention. System 1200 can execute any of the mentioned above methods or any combination of stages of any mentioned above method.

FIG. 12 illustrates system 1200 as including (a) a memory module 1210 arranged to store an image of a pattern; wherein the image is generated by scanning the pattern with a charged particle beam; (b) a edge enhancement circuit 1220 arranged to process the image to provide an edge enhanced image by applying a n'th order polynomial filter on the image, wherein n exceeds two; and (c) a edge detection circuit 1230 arranged to find edges of the pattern by detecting paths in the edge enhanced image. Any one of components 1210, 1220 and 1230 can be a hardware component or executed (or hosted) by a hardware component such as a server, a computer, dedicated ASIC, processors, digital signal processors and the like.

FIG. 12 also illustrates system 1200 as including an image acquisition module 1240 for acquiring the image by scanning the pattern with the charged particle beam. It is noted that system 1200 can be implemented without the image acquisition module 1240 and may receive the image from such a module or from another module.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD ROM, CD R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connections that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for detecting a parameter of a pattern, the method comprising:
    obtaining an image of the pattern; wherein the image is generated by scanning the pattern with a charged particle beam;
    processing the image to provide an edge enhanced image; wherein the processing comprises computing an aggregate energy of first n spectral components of the image by applying spectral functions on the image, wherein n exceeds two and the spectral functions are selected according to a distribution of charged particles of the charged particle beam; and
    further processing the edge enhanced image and determining a parameter of the pattern.

2. The method according to claim 1 wherein the spectral functions are discrete orthonormal functions.

3. A method for detecting a parameter of a pattern, the method comprising:
    obtaining an image of the pattern, wherein the image is generated by scanning the pattern with a charged particle beam;
    processing the image to provide an edge enhanced image; wherein the processing comprises computing an aggregate energy of first n spectral components of the image, wherein n exceeds two and wherein the computing comprises applying an n'th order polynomial filter on the image; and
    further processing the edge enhanced image and determining a parameter of the pattern.

4. The method according to claim 3 further comprising finding a main direction of the edges of the pattern; and wherein the applying of the n'th order polynomial filter is responsive to the main direction.

5. The method according to claim 4 further comprising applying the n'th order polynomial filter at a direction that is substantially normal to the main direction.

6. The method according to claim 4 further comprising applying an averaging function at a direction that is substantially parallel to the main direction.

7. The method according to claim 3 wherein the n'th polynomial filter comprises a combination of n orthogonal polynomials of first till n'th order.

8. The method according to claim 3 wherein the n'th polynomial filter comprises a combination of n orthonormal polynomials of first till n'th order.

9. The method according to claim 1 wherein said parameter is one of a group consisting of feature edge, feature roughness, edge slope, feature height, feature material.

10. The method according to claim 1 wherein said further processing comprising detecting paths of the edge enhanced image by applying a dynamic programming process that is responsive to a main direction of edges of the pattern.

11. The method according to claim 1 wherein said further processing comprising detecting paths of the edge enhanced image includes determining scores for multiple paths by repetitively:
    a. finding a best path by applying a dynamic programming process to identify a path with a highest current score, and
    b. mitigating an effect of the best path before finding a path with a new highest score.

12. The method according to claim 1 wherein said further processing comprising clustering paths according to a score associated with each path and ignoring paths that belong to a lowest score cluster.

13. The method according to claim 12 wherein the clustering of paths comprises clustering the paths so that a largest difference between any scores of paths that belong to a same cluster is smaller than any difference between scores of paths that belong to different clusters.

14. The method according to claim 1 further comprising obtaining an image of a pattern that comprises multiple lines by scanning the pattern with a charged particle beam, wherein a width of at least one of the multiple lines is smaller than a width of the charged particle beam.

15. A non-transitory computer readable medium that stores instructions for:
    obtaining an image of the pattern; wherein the image is generated by scanning the pattern with a charged particle beam;
    processing the image to provide an edge enhanced image; wherein the processing comprises computing aggregate energy of first n spectral components of the image by applying spectral functions on the image, wherein n exceeds two and the spectral functions are selected according to a distribution of charged particles of the charged particle beam; and further processing the edge enhanced image and determining a parameter of the pattern.

16. A system comprising:
a memory module arranged to store an image of a pattern; wherein the image is generated by scanning the pattern with a charged particle beam;
an edge enhancement circuit arranged to process the image to provide an edge enhanced image by computing aggregate energy of first n spectral components of the image and applying spectral functions on the image, wherein n exceeds two and the spectral functions are selected according to a distribution of charged particles of the charged particle beam; and
a detection circuit arranged to process the edge enhanced image and determine a parameter of the pattern.

17. A system according to claim 16 wherein said detection circuit is adapted to find edges of the pattern by detecting paths in the edge enhanced image.

18. A system according to claim 16 wherein the spectral functions are discrete orthonormal functions.

19. A non-transitory computer readable medium according to claim 15 wherein the spectral functions are discrete orthonormal functions.

20. A non-transitory computer readable medium according to claim 15 wherein said further processing comprising detecting paths of the edge enhanced image includes determining scores for multiple paths by repetitively: finding a best path by applying a dynamic programming process to identify a path with a highest current score, and mitigating an effect of the best path before finding a path with a new highest score.

* * * * *